United States Patent
Kraus et al.

(10) Patent No.: US 8,370,988 B2
(45) Date of Patent: Feb. 12, 2013

(54) WINDSHIELD WIPING DEVICE, ESPECIALLY FOR A MOTOR VEHICLE

(75) Inventors: Achim Kraus, Buehl (DE); Juergen Rapp, Lauf (DE); Heiko Volz, Achern (DE)

(73) Assignee: Robert Bosch GmbH, Stuttgart (DE)

( * ) Notice: Subject to any disclaimer, the term of this patent is extended or adjusted under 35 U.S.C. 154(b) by 1228 days.

(21) Appl. No.: 10/589,812

(22) PCT Filed: Jan. 28, 2005

(86) PCT No.: PCT/EP2005/050365
§ 371 (c)(1), (2), (4) Date: Aug. 17, 2006

(87) PCT Pub. No.: WO2005/082689
PCT Pub. Date: Sep. 9, 2005

(65) Prior Publication Data
US 2007/0163068 A1 Jul. 19, 2007

(30) Foreign Application Priority Data
Feb. 26, 2004 (DE) .......................... 10 2004 009 279

(51) Int. Cl.
*B60S 1/06* (2006.01)

(52) U.S. Cl. ............... 15/250.3; 15/250.31; 15/250.001; 296/96.15; 296/96.17

(58) Field of Classification Search .................. 15/250.3, 15/250.31, 250.001; 296/96.15, 96.17; 74/42, 74/43
See application file for complete search history.

(56) References Cited

U.S. PATENT DOCUMENTS

| | | | | |
|---|---|---|---|---|
| 5,271,120 A | * | 12/1993 | Eustache et al. | 15/250.01 |
| 6,101,664 A | * | 8/2000 | Egner-Walter et al. | 15/250.3 |
| 6,637,798 B2 | * | 10/2003 | Hoshikawa et al. | 296/96.17 |
| 7,000,283 B2 | * | 2/2006 | Rapp | 15/250.3 |
| 2002/0083544 A1 | * | 7/2002 | Masuda | 15/250.31 |
| 2004/0049875 A1 | * | 3/2004 | Metz | 15/250.27 |

FOREIGN PATENT DOCUMENTS

| | | | |
|---|---|---|---|
| DE | 198 29 320 | | 1/2000 |
| EP | 0306361 | * | 3/1989 |
| EP | 0359733 | * | 3/1990 |
| EP | 0 739 792 | | 10/1996 |
| EP | 1122137 | * | 2/2001 |
| EP | 1219513 A2 | | 7/2002 |
| JP | 62161081 U | | 10/1987 |
| JP | 01112481 | | 1/1989 |
| JP | 3009953 | | 1/1991 |
| JP | 6148245 | | 5/1994 |
| JP | 9020213 | | 1/1997 |
| JP | 9030373 | | 2/1997 |
| JP | 9039741 | | 2/1997 |
| JP | 9039745 | | 2/1997 |
| JP | 2000025580 | | 1/2000 |
| JP | 2001138870 | | 5/2001 |
| JP | 2001-301578 | | 10/2001 |
| WO | 02/22409 | * | 3/2002 |
| WO | 03/035440 | * | 5/2003 |
| WO | 03/099620 | * | 12/2003 |

* cited by examiner

*Primary Examiner* — Gary Graham
(74) *Attorney, Agent, or Firm* — Michael Best & Friedrich LLP

(57) ABSTRACT

A windshield wiper device (10) especially for a motor vehicle is proposed. Said device is comprised essentially of a plate-shaped base (12), on which a drive unit (18), a wiper bearing (14) and a retaining element (26) are arranged. In accordance with the invention, the plate-shaped base (12) is provided with predetermined breaking points (36).

11 Claims, 2 Drawing Sheets

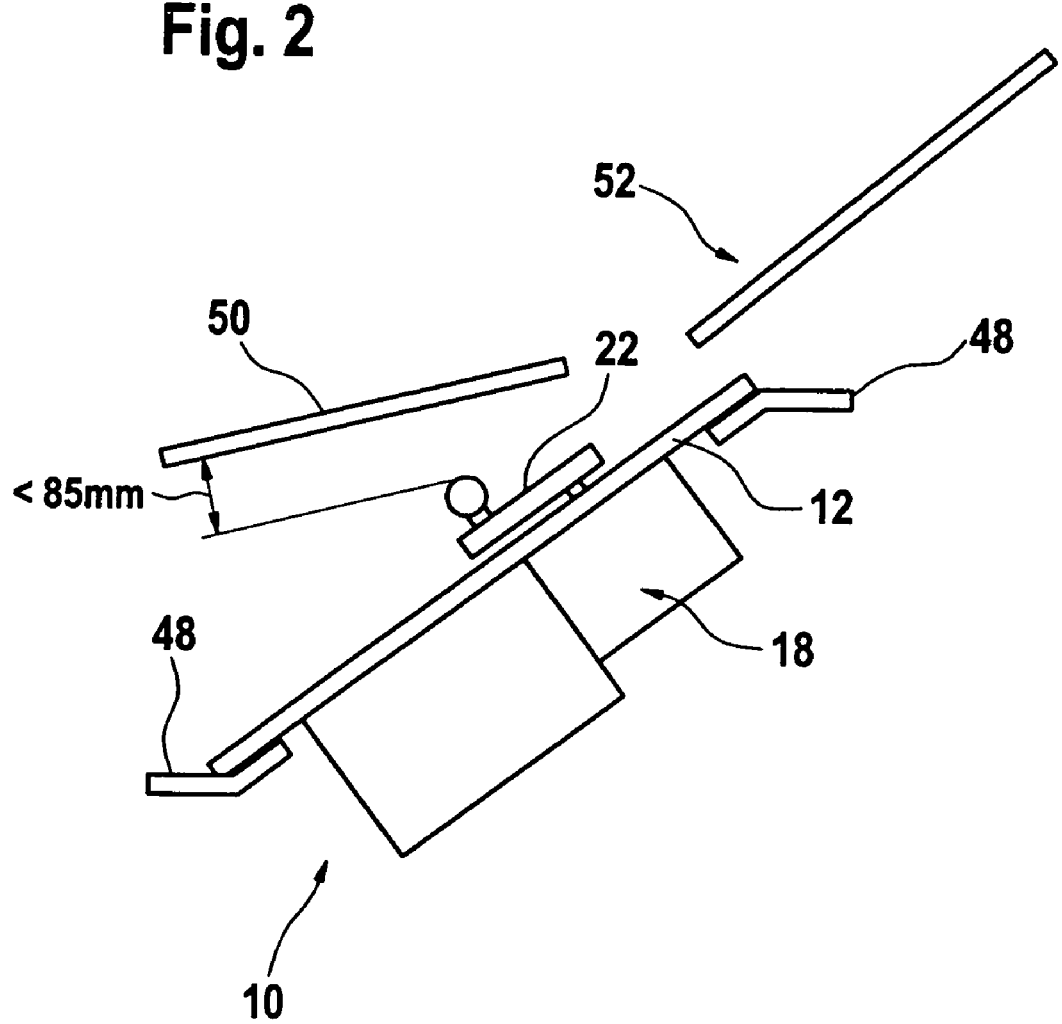

WINDSHIELD WIPING DEVICE, ESPECIALLY FOR A MOTOR VEHICLE

BACKGROUND OF THE INVENTION

The invention relates to a windshield wiper device, especially for motor vehicle.

Numerous windshield wiper devices are known, which have a plate-shaped base on which an electric motor as a drive unit is arranged and a wiper bearing to support the wiper shaft. The wiper shaft normally bears the wiper arm, on whose free end the wiper blade is fastened, which in operation moves over the windshield in a pendulum fashion. For fastening to the body of the motor vehicle, the plate-shaped base has sections with holes as retaining elements, with whose help the windshield wiper device can be screwed onto the body of the motor vehicle.

On the motor vehicle, the wiper shafts project from the body so that if a pedestrian impacts the body of the motor vehicle, he can be injured easily on the wiper arms, wiper blades or on the wiper shaft itself.

SUMMARY OF THE INVENTION

As a result, it is desirable, in the case of a pedestrian impact with the wiper shafts projecting from the body or with the body in the region of the windshield wiper device itself, for the windshield wiper device to be able to yield so that the risk of injury to the impacting pedestrian is reduced.

The advantage of the windshield wiper device in accordance with the invention is that in the case of an impact of a pedestrian with the body of the motor vehicle in the region of the windshield wiper device, it is able to yield without costly, active components being required.

It is especially advantageous if the predetermined breaking point is arranged in the region of the retaining element and/or in the region of the wiper bearing since the greatest mechanical stress occurs in this region in the case of the impact of a pedestrian or when bending the base.

It is especially simple and cost-effective if the predetermined breaking point is embodied as a bore hole, elongated hole or break-through.

High stability of the base is achieved by providing a collar-like border. In addition, high resistance to torsion of the base is achieved thereby.

In addition, it must be viewed as advantageous if the drive unit is accommodated within the border since a very compact embodiment of the windshield wiper device is achieved in this way.

Particularly if larger windshield wiper devices are supposed to be realized, it is advantageous if the base has a fastening element, which serves as the fastening of a support tube. Another wiper bearing, which bears another wiper shaft, can be provided on this support tube.

In an advantageous and especially elegant embodiment, the base has stress-controlling elements, which are arranged in such a way that the mechanical stress in the base is increased such that, in the case of an impact in the region of the predetermined breaking points, the base breaks at the predetermined breaking points thereby facilitating the yielding of the windshield wiper device.

In addition, it is especially advantageous in this case that one predetermined breaking point is arranged approximately centrally in the plate-shaped base.

BRIEF DESCRIPTION OF THE DRAWINGS

One exemplary embodiment of the invention is depicted in the drawing and explained in greater detail in the following description.

The drawings show:

FIG. 2 A schematic representation of a windshield wiper device in accordance with the invention in an installation position in a motor vehicle.

DETAILED DESCRIPTION

Figure 1:
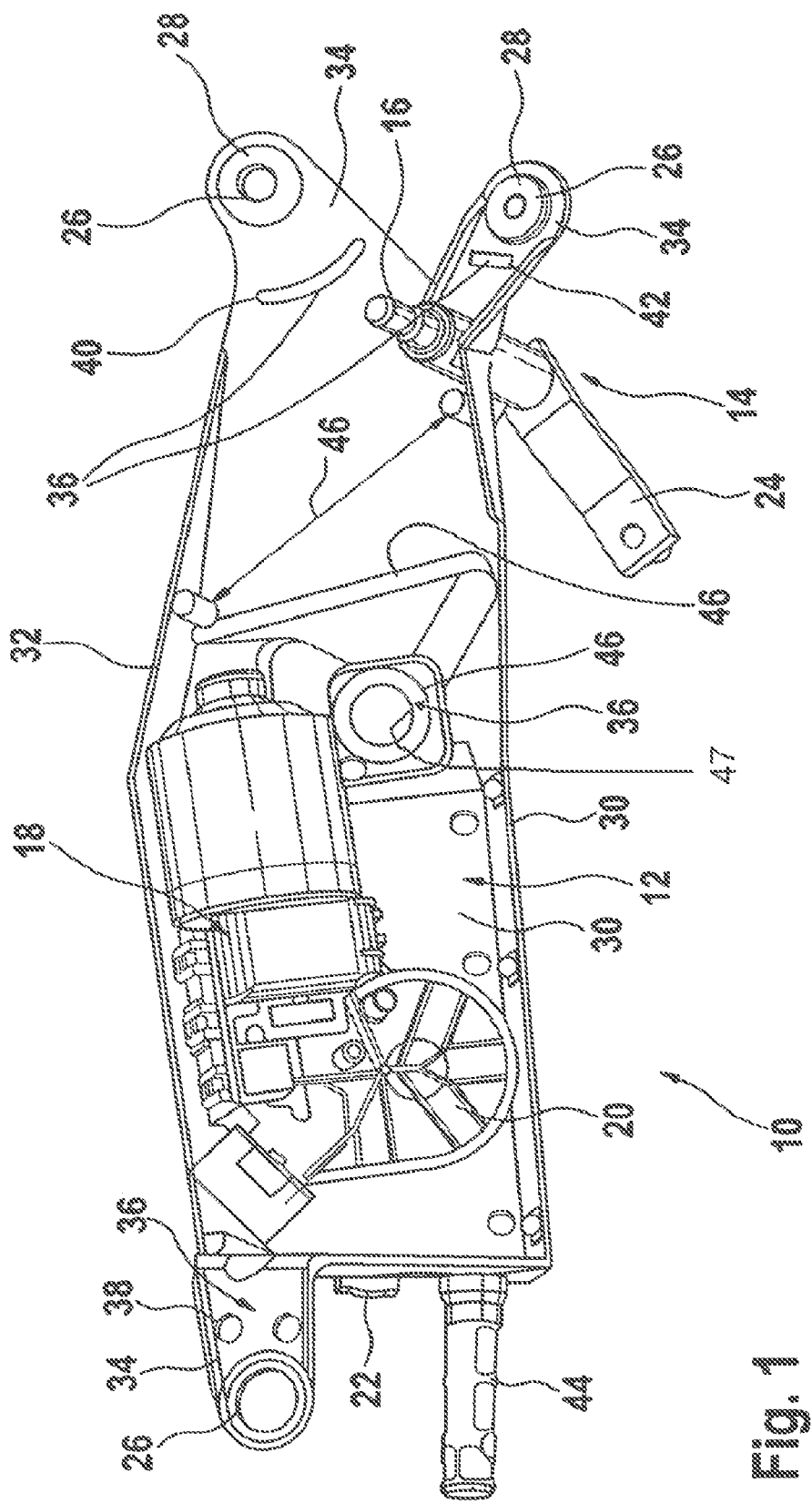
FIG. 1 A perspective representation of a windshield wiper device in accordance with the invention.

FIG. 1 shows a perspective representation of a windshield wiper device 10 in accordance with the invention. It is comprised essentially of a plate-shaped base 12, on which a wiper bearing 14 is fastened. Naturally the wiper bearing 14 can also be embodied as a one-part piece with the base 12 and be manufactured in a diecasting process for example.

The wiper bearing 14 supports a wiper shaft 16, which in an installed position projects out of the body of the motor vehicle and to which the wiper arms with wiper blades (not shown in this case) are fastened. In addition, the base 12 supports a drive 18, which is embodied as an electric motor and puts an output crank 22 into a back-and-forth motion or a rotating rotary movement via a gear 20. The output crank 22 is connected to a drive crank 24 via a thrust rod (not shown here for the sake of providing a clear overview), which drive crank is connected in turn in a rotationally secured manner with the wiper shaft 16 so that it executes a back-and-forth movement in operation thereby putting the wiper arm with the wiper blade into a pendulum motion.

For fastening to the body of the motor vehicle, the base 12 has retaining elements 26, which are embodied as bore holes in fastening sections 34 of the plate-shaped base 12. Situated in the bore holes 26 are rubber-like dampening elements 28, which dampen the vibrations of the base 12 against the body of the motor vehicle.

The base 12 is comprised essentially of a rectangular plate 30 from whose edge the wall-shaped border 33 extends in a collar-like manner towards the side facing the drive 18. The plate 30 has essentially a rectangular shape from which the lobe-like fastening sections 34 extend. The wall-shaped border 33 can enclose the fastening sections 34 or else also bypass them.

Predetermined breaking points 36 are arranged between each of the fastening sections 34 and the plate 30 of the base 12. These predetermined breaking points 36 are designed so that when a pedestrian impacts the body of the motor vehicle in the region of the windshield wiper device 10 or especially on the wiper shaft 16 of the windshield wiper device 10, they will bend or break off so that the windshield wiper device 10 and the wiper shaft 16 in particular will yield in order to reduce the pedestrian's risk of injury from the windshield wiper device or the body of the motor vehicle.

The predetermined breaking points are embodied in this case as a bore hole 38, as an elongated hole 40 or as a break-through 42. Naturally, other embodiments are possible; what is crucial is that a weakening of the resistance cross section be provided between the fastening section 34 and the plate 30 of the base 12.

In addition, the base 12 has a cylindrical connecting piece as a fastening element 44, which extends perpendicularly from the collar-like border 32 of the base 12 and is used to fasten a support tube, which is able to bear another wiper bearing. For the sake of providing a clear overview, the support tube with the additional wiper bearing is not shown here.

The plate-shaped base 12 also has stress-controlling elements 46, which are embodied as recesses or material accumulations. They are arranged in such a way that the stress in the base 12 in an impact of a pedestrian with the windshield wiper device 10 will increase on the predetermined breaking points 36 in such a way that the predetermined breaking points 36 will bend or even break off completely. The arrangement of these stress-controlling elements 46 can be determined in a simple manner using a finite element simulation, and is a function of the precise shape of the base 12 and the arrangement of the drive unit 18 as well as the fastening sections 34 and the arrangement of the wiper bearing 14.

A central bore hole 47 in the plate 30 of the base 12 works in this case a stress-controlling element 46 and as a predetermined breaking point 36 at the same time.

FIG. 2 shows a schematic representation of the arrangement of a windshield wiper device 10 in a motor vehicle. The base 12 is fastened to body sections 48 of the motor vehicle. The engine hood 50 is arranged over the windshield wiper device 10 so that a minimum distance of 85 mm is achieved between the output crank 22 of the windshield wiper device 10 and the engine hood 50. Arranged above the windshield wiper device 10 is the windshield 52 over which the wiper arms with the wiper blades glide in operation.

The invention claimed is:

1. Windshield wiper device (10) including a plate-shaped base (12), on which at least one drive unit (18), at least one wiper bearing (14) and at least one retaining element (26) are arranged, characterized in that the plate-shaped base (12) has at least one predetermined breaking point (36) and stress-controlling elements (46), the stress controlling elements being arranged to increase on the predetermined breaking point (36) a stress in the base (12) in an impact with the windshield wiper device (10) to cause the predetermined breaking point (36) to one of bend and break off completely, and characterized in that the at least one predetermined breaking point (36) is embodied as a hole having a perimeter and a stress-controlling element (46) is embodied as one of a recess and a material accumulation on the perimeter of and surrounding the hole.

2. Windshield wiper device (10) according to claim 1, characterized in that a predetermined breaking point (36) is arranged in the region of one of the retaining element (26) and the wiper bearing (14).

3. Windshield wiper device (10) according to claim 1, characterized in that the base (12) has a collar-like border along a perimeter.

4. Windshield wiper device (10) according to claim 3, characterized in that the drive unit (18) is accommodated within the border (33).

5. Windshield wiper device (10) according to claim 4, characterized in that a fastening element (44) is provided on the base (12), which serves as the fastening of a support tube.

6. Windshield wiper device (10) according to claim 5, characterized in that the at least one predetermined breaking point (36) is arranged approximately centrally in the plate-shaped base (12).

7. Windshield wiper device (10) according to claim 1, characterized in that a fastening element (44) is provided on the base (12), which serves as the fastening of a support tube.

8. Windshield wiper device (10) according to claim 1, characterized in that the at least one predetermined breaking point (36) is arranged approximately centrally in the plate-shaped base (12).

9. Windshield wiper device (10) according to claim 1, characterized in that a predetermined breaking point (36) is located in the plate-shaped base (12) between the at least one wiper bearing (14) and the at least one retaining element (26), and characterized in that a stress-controlling element (46) is located in the plate-shaped base (12) on a side of the at least one wiper bearing (14) away from the at least one predetermined breaking point (36).

10. Windshield wiper device (10) according to claim 1, characterized in that a predetermined breaking point (36) is located in the plate-shaped base (12) between the at least one drive unit (18) and the at least one retaining element (26), and characterized in that a stress-controlling element (46) is located in the plate-shaped base (12) between the at least one drive unit (18) and the at least one predetermined breaking point (36).

11. Windshield wiper device (10) according to claim 1, characterized in that the base (12) has a perimeter, and characterized in that the stress-controlling elements (46) are within the perimeter.

* * * * *

UNITED STATES PATENT AND TRADEMARK OFFICE
CERTIFICATE OF CORRECTION

PATENT NO. : 8,370,988 B2 Page 1 of 1
APPLICATION NO. : 10/589812
DATED : February 12, 2013
INVENTOR(S) : Kraus et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1340 days.

Signed and Sealed this
First Day of September, 2015

Michelle K. Lee
*Director of the United States Patent and Trademark Office*